(12) United States Patent
Wei et al.

(10) Patent No.: US 10,020,921 B2
(45) Date of Patent: Jul. 10, 2018

(54) DIRECTIONAL REFERENCE SIGNAL TRANSMISSION

(71) Applicants: National Taiwan University, Taipei (TW); MediaTek Inc., Hsinchu (TW)

(72) Inventors: Hung-Yu Wei, Taipei (TW); Chung-Wei Weng, Kaohsiung (TW); Chia-Hao Yu, Yilan County (TW)

(73) Assignees: National Taiwan University, Taipei (TW); MediaTek Inc., Hsinchu (TW)

( * ) Notice: Subject to any disclaimer, the term of this patent is extended or adjusted under 35 U.S.C. 154(b) by 170 days.

(21) Appl. No.: 15/157,423

(22) Filed: May 18, 2016

(65) Prior Publication Data

US 2017/0141894 A1 May 18, 2017

Related U.S. Application Data

(60) Provisional application No. 62/256,716, filed on Nov. 18, 2015.

(51) Int. Cl.
*H04W 4/00* (2018.01)
*H04L 5/00* (2006.01)
(Continued)

(52) U.S. Cl.
CPC ......... *H04L 5/0048* (2013.01); *H04B 17/309* (2015.01); *H04W 4/02* (2013.01);
(Continued)

(58) Field of Classification Search
None
See application file for complete search history.

(56) References Cited

U.S. PATENT DOCUMENTS 8,514,130 B1 * 8/2013 Jensen ............... H01Q 3/446
342/367
2005/0026562 A1 2/2005 Goldberg et al.
(Continued)

OTHER PUBLICATIONS

"Office Action of Taiwan Counterpart Application," dated Jun. 30, 2017, p. 1-p. 15.
(Continued)

*Primary Examiner* — Bob Phunkulh
(74) *Attorney, Agent, or Firm* — JCIPRNET

(57) ABSTRACT

The disclosure is directed to a method of transmitting a reference signal and related electronic devices using the same. In one of the exemplary embodiments, the method would include not limited to transmitting a reference signal by using a directional antenna emitting a first radiation pattern of one or more beams covering $$\frac{360}{N}$$

degrees per one of N time slots during a first phase of a full sweeping period, wherein N≥2 and transmitting the reference signal, in response to transmitting the reference signal by using the directional antenna which has the first radiation pattern, by using the directional antenna emitting a second radiation pattern of multiple beams having different angles simultaneously covering a total of $$\frac{360}{M}$$

(Continued)

degrees of angles per one of M time slots during a second phase of the full sweeping period, wherein N>M≥1.

15 Claims, 16 Drawing Sheets

(51) Int. Cl.

| | | |
|---|---|---|
| *H04B 17/309* | (2015.01) | |
| *H04W 4/02* | (2018.01) | |
| *H04W 16/28* | (2009.01) | |
| *H04W 72/04* | (2009.01) | |
| *H04W 52/24* | (2009.01) | |

(52) U.S. Cl.
CPC ....... *H04W 16/28* (2013.01); *H04W 72/0446* (2013.01); *H04W 52/242* (2013.01)

(56) References Cited

U.S. PATENT DOCUMENTS

| | | | |
|---|---|---|---|
| 2005/0233699 A1* | 10/2005 | Tegreene | H04W 16/28 455/63.4 |
| 2007/0002805 A1* | 1/2007 | Laurila | H01Q 1/246 370/337 |
| 2007/0164908 A1* | 7/2007 | Turchinetz | H01Q 1/38 343/700 MS |
| 2007/0238410 A1* | 10/2007 | Tegreene | H04L 67/125 455/25 |
| 2008/0064338 A1* | 3/2008 | Tegreene | H01Q 3/26 455/63.4 |
| 2008/0171519 A1* | 7/2008 | Tegreene | H01Q 3/00 455/73 |
| 2010/0172296 A1* | 7/2010 | Singh | H04W 84/18 370/328 |
| 2010/0202434 A1* | 8/2010 | Wu | H01Q 21/205 370/345 |
| 2011/0182174 A1 | 7/2011 | Pi et al. | |
| 2012/0202548 A1 | 8/2012 | Lee et al. | |
| 2013/0072247 A1 | 3/2013 | Park et al. | |
| 2013/0182683 A1 | 7/2013 | Seol et al. | |
| 2013/0215844 A1 | 8/2013 | Seol et al. | |
| 2013/0301619 A1 | 11/2013 | Singh et al. | |
| 2013/0331081 A1* | 12/2013 | Rune | H04B 7/0408 455/418 |
| 2014/0073337 A1 | 3/2014 | Hong et al. | |
| 2014/0206406 A1 | 7/2014 | Cordeiro et al. | |
| 2014/0307664 A1 | 10/2014 | Chen et al. | |
| 2015/0133173 A1* | 5/2015 | Edge | G01S 1/66 455/456.6 |
| 2015/0223088 A1 | 8/2015 | Niu et al. | |
| 2016/0097847 A1* | 4/2016 | Loesch | G01S 13/42 342/156 |
| 2016/0302081 A1* | 10/2016 | Liu | H01Q 3/446 |
| 2017/0111094 A1* | 4/2017 | Sartori | H04B 7/0617 |

OTHER PUBLICATIONS

Shokri-Ghadikolaei et al., "Millimeter Wave Cellular Networks: A MAC Layer Perspective", IEEE Transactions on Communications, Oct. 2015, pp. 3437-3458.
Chandra et al., "60 GHz MAC Standardization: Progress and Way Forward", 2015 12th Annual IEEE Consumer Communications and Networking Conference (CCNC), Jan. 9-12, 2015, pp. 182-187.
Wang et al., "Beam Codebook Based Beamforming Protocol for Multi-Gbps Millimeter-Wave WPAN Systems", IEEE Journal on Selected Areas in Communications, Oct. 2009, pp. 1390-1399.
Desai et al., "Initial Beamforming for mmWave Communications", 2014 48th Asilomar Conference on Signals, Systems and Computers, IEEE, Nov. 2-5, 2014, pp. 1926-1930.
Li et al., "On the Efficient Beam-Forming Training for 60GHz Wireless Personal Area Networks", IEEE Transactions on Wireless Communications, Feb. 2013, pp. 504-515.
Jeong et al., "Random Access in Millimeter-Wave Beamforming Cellular Networks: Issues and Approaches", IEEE Communications Magazine, Jan. 2015, pp. 180-185.
Barati et al., "Directional Cell Discovery in Millimeter Wave Cellular Networks", IEEE Transactions on Wireless Communications, Dec. 2015, pp. 6664-6678.
Barati et al., "Directional Initial Access for Millimeter Wave Cellular Systems", 2015 49th Asilomar Conference on Signals, Systems and Computers, IEEE, Nov. 8-11, 2015, pp. 307-311.
Capone et al., "Context Information for Fast Cell Discovery in mm-wave 5G Networks", Proceedings of 21th European Wireless Conference, May 2015, pp. 400-405.
Capone et al., "Obstacle Avoidance Cell Discovery Using mm-waves Directive Antennas in 5G Networks", 2015 IEEE 26th International Symposium on Personal, Indoor, and Mobile Radio Communications (PIMRC), Sep. 2015, pp. 2349-2353.
Prasad et al., "Network Assisted Small Cell Discovery in Multi-Layer and mmWave Networks", 2015 IEEE Conference on Standards for Communications and Networking (CSCN), Oct. 2015, pp. 118-123.
Yu et al., "Beam Space Selection for High Rank Millimeter Wave Communication", 81st IEEE Vehicular Technology Conference (VTC Spring), May 2015, pp. 1-5.

* cited by examiner

DIRECTIONAL REFERENCE SIGNAL TRANSMISSION

CROSS REFERENCE TO RELATED APPLICATION

This application claims the priority benefit of U.S.A. provisional application Ser. No. 62/256,716, filed on Nov. 18, 2015. The entirety of the above-mentioned patent application is hereby incorporated by reference herein and made a part of specification.

TECHNICAL FIELD

The disclosure is directed to a method of transmitting a reference signal and related electronic devices using the same.

BACKGROUND

The Millimeter Wave (mm-Wave) communication is an emerging technology endowed with large spectrum resources as the technology operates on one or more frequency bands between 30 GHz and 300 GHz. Radio transmissions under such high frequencies would result in large free-space loss for the transmissions. Since the short wavelengths of mm-Wave signals would result in short spacing between antenna elements, the quantity of antenna element packings in an antenna module may escalate as the result of the increase of operating frequency. Consequently, dense antenna elements may result in antenna arrays having radiation patterns with high directivity and large beamforming antenna gains. According to Friis free-space equation, a directional antenna with a high antenna gain would be able to make up the free-space path loss. Recent studies has also shown that high gain antenna is able to overcome the free-space loss achieving over 100 m communication range, even in non-line-of-sight (NLoS) channels.

However, wireless communications using directional antennas would require transmissions in appropriate directions. Such a constraint has led to the initial discussions to cope with challenges associated with reference signaling designs. Even though wireless PAN and wireless LAN on mm-Wave such as IEEE 802.15.3c and IEEE 802.11ad have been developed, a MAC protocol using directional antenna in mm-Wave may nevertheless require re-designs in order to be incorporated in a cellular system.

As the Millimeter Wave technology would likely be adopted as the communication technology of the next generation, a base station operating under millimeter waves would be required to strategically design directional antennas to concentrate transmission powers in particular directions in order to provide the optimum coverage. As an example, FIG. 1 illustrates a communication system which uses Millimeter Wave technology. In the example of FIG. 1, a base station 101 may serve an individual user equipment (UE) such as a mobile phone 102 or a vehicle 104 or may serve UEs operating within a network such as a device to device (D2D) communication network 103 with millimeter waves. In such scenario, a base station would need to know which direction to transmit in order to cover all the UEs because antennas having directivities are required in order to mitigate severe path losses as previously mentioned. Therefore, the direction or position in the argular domain of each of the UEs relative to the base station would need to be known. Also, a base station would need to know the condition of channels between the base station 101 and UEs 102, 103, 104 in order to allocate resources for the UEs.

To obtain the direction of UEs and conditions of channels, a base station conventionally rely upon transmitting reference signals in exchange for channel condition information received from UEs. FIG. 2 illustrates an example of transmitting a reference signal (RS) from a base station 201 and receiving of the reference signal by a UE 202. In response to receiving reference signal, the UE may perform channel estimation (e.g. channel quality indicator (CQI) measurement) and then transmit a feedback signal (S1) to the base station 201. Overall, the process of FIG. 2 could also be used for collecting information about the radio frequency (RF) beam which is used to serve the UE 202 in addition to the measurement of the channel condition between the base station 201 and the UE 202. Consequently, the UE 202 may perform a mm-Wave cell search based on the reference signal (RS), and the base station 201 may be able to perform beam training or beam track based on the feedback signal (S1) from the UE 202.

The reference signaling mechanism of FIG. 2 would be able to support cell discoveries and channel measurements. However, in general, if a base station uses an omni-directional mm-Wave for signaling, the range of the signaling would be shorter than using a directional mm-Wave for signaling, assuming that the maximum transmission power of a base station is a constant. This would potentially lead to the control channels and the data channels having different transmission ranges. If a UE uses directional reception in mm-Wave for reference signaling, it may require beam alignments between a base station and a UE and thus would lead to large overheads.

FIG. 3 illustrate an example of transmitting directional specific reference signals from a base station for a plurality of user equipment situated in different locations. FIG. 3 assumes a 2-dimensional horizontal plot (X-Y plane) relative to the earth's surface. In a typical mm-Wave communication system, a base station 301 may need to serve multiple UEs 311, 312, 313, 314 located in various locations around the base station 301. In order to serve UEs 311, 312, 313, 314, the base station 301 would need to know which beam would best serve any particular UEs 311, 312, 313, 314. More specifically, the base station 301 would need to know the location of the UEs 311, 312, 313, 314 as well as the channel conditions of each of the UEs 311, 312, 313, 314. This could be accomplished by the reference signal mechanism of FIG. 2. A base station 301 may either transmit reference signals through directional beams of different angles or perform an omni-directional transmission for reference signals.

FIG. 4 illustrates an example of transmitting a single directional reference signal from a base station in comparison to transmitting multiple directional reference signals. Assuming that the maximum overall transmission power used by a base station is constant, omni-directional transmission would have a shorter range; whereas a directional RF beam, though having a longer transmission range, would only cover a specific direction instead of all directions. As shown in FIG. 4, having multiple simultaneous directional beams would incur reduced power for each simultaneous beam relative to a single directional beam assuming that power is equally shared among each simultaneous beam. Thus in FIG. 4, there is more power and greater range in the single RF beam used by the base station 401 to scan UE 411 than the each of the four beams sued to scan four UEs 411 412 413 414 simultaneously.

Because of the nature of mm-Wave based 5G systems as described above, transmissions of reference signals may need to be designed according to the mm-Wave characteristics which may require directional beams. Thus, the disclosure proposes a method and a system of transmitting reference signals by taking account of the mm-Wave characteristics.

SUMMARY OF THE DISCLOSURE

Accordingly, the disclosure is directed to a method of transmitting a reference signal and related electronic devices using the same.

In one of the exemplary embodiments, the disclosure is directed to a method of transmitting a reference signal, applicable to a base station, and the method would include not limited to: transmitting a reference signal by using a directional antenna emitting a first radiation pattern of one or more beams covering $$\frac{360}{N}$$

degrees per one of N time slots during a first phase of a full sweeping period, wherein N≥2 and transmitting the reference signal, in response to transmitting the reference signal by using the directional antenna which has the first radiation pattern, by using the directional antenna emitting a second radiation pattern of multiple beams having different angles simultaneously covering a total of $$\frac{360}{M}$$

degrees of angles per one of M time slots during a second phase of the full sweeping period, wherein N>M≥1.

In one of the exemplary embodiments, the disclosure is directed to a base station which would include not limited to: a transmitter; and a processor coupled to the transmitter and is configured at least for: transmitting, via the transmitter, a reference signal by using a directional antenna emitting a first radiation pattern of one or more beams covering $$\frac{360}{N}$$

degrees per one of N time slots during a first phase of a full sweeping period, wherein N≥2 and transmitting, via the transmitter, the reference signal, in response to transmitting the reference signal by using the directional antenna which has the first radiation pattern, by using the directional antenna emitting a second radiation pattern of multiple beams having different angles simultaneously covering a total of $$\frac{360}{M}$$

degrees of angles per one of M time slots during a second phase of the full sweeping period, wherein N>M≥1.

In one of the exemplary embodiments, the disclosure is directed to a method of receiving a reference signal, applicable to a user equipment, and the method would include not limited to: receiving a reference signal transmitted in a first radiation pattern of one or more beams covering $$\frac{360}{N}$$

degrees per one of N time slots during a first phase of a full sweeping period, wherein N≥2 and in response to receiving the reference signal transmitted in the first radiation pattern, receiving the reference signal transmitted in a second radiation pattern of multiple beams having different angles simultaneously covering a total of $$\frac{360}{M}$$

degrees of angles per one of M time slots during a second phase of the full sweeping period, wherein N>M≥1.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
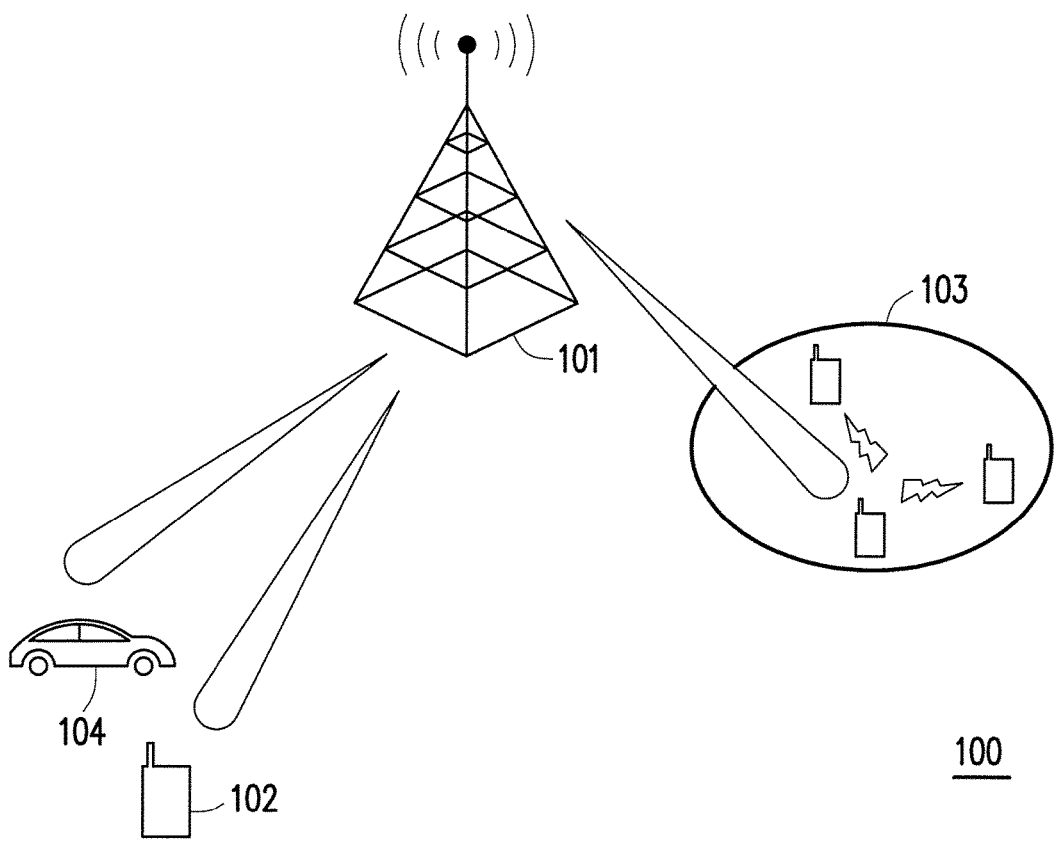
FIG. 1 illustrates a communication system which uses Millimeter Wave technology as an example.
Figure 2:
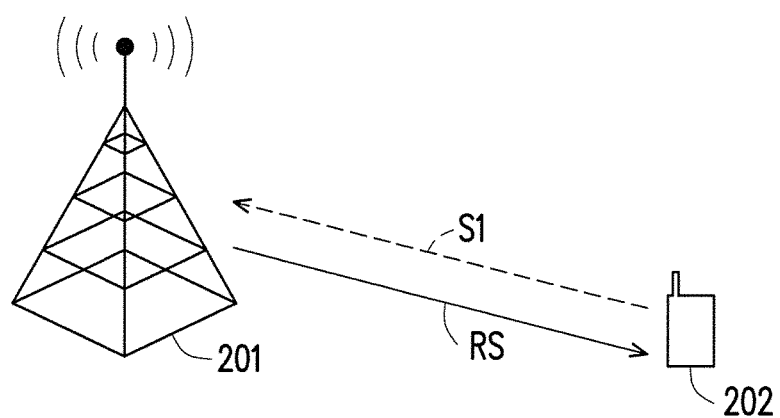
FIG. 2 illustrates an example of transmitting a reference signal from a base station and receiving of the reference signal by a user equipment.
Figure 3:
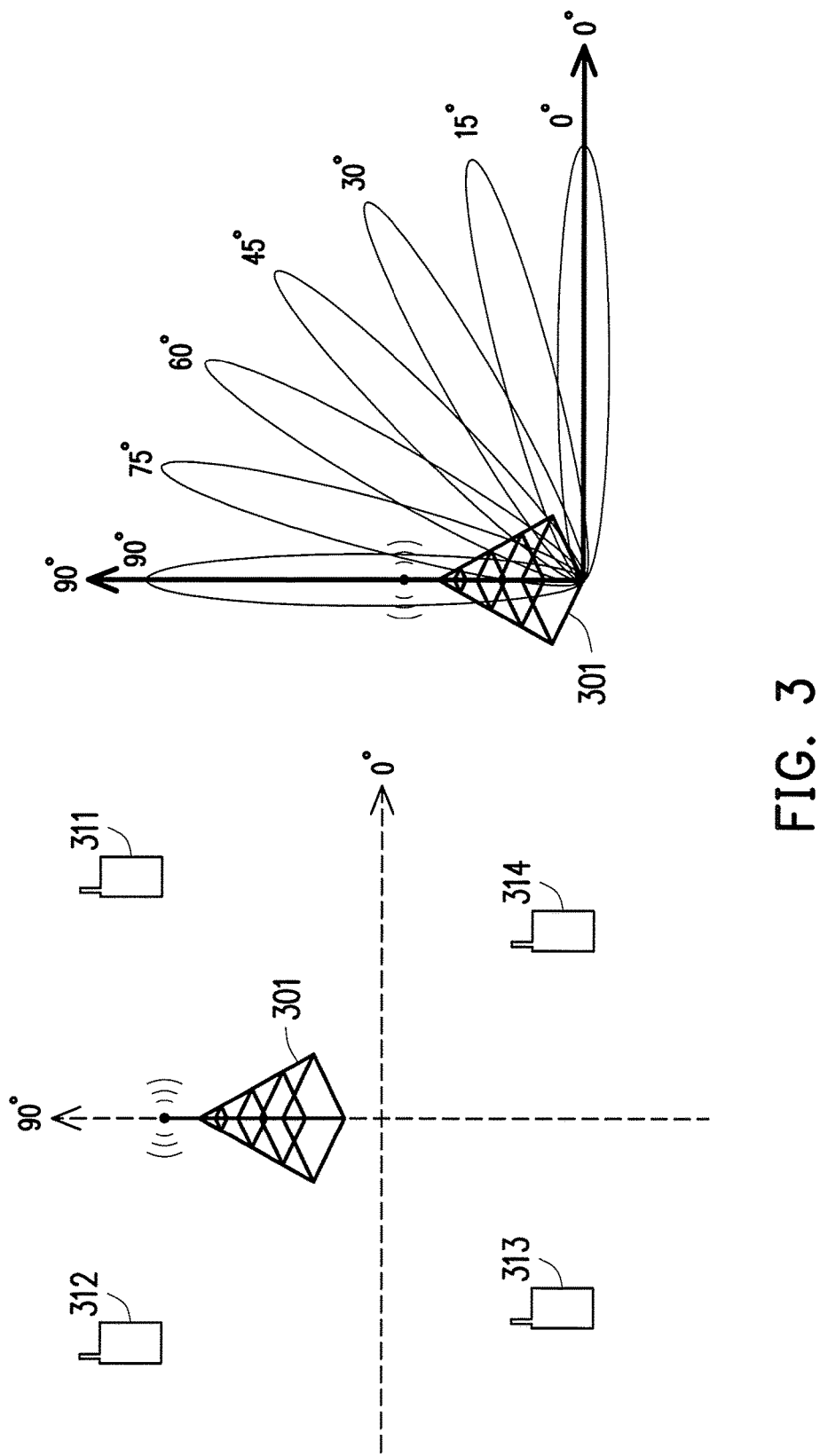
FIG. 3 illustrates an example of transmitting reference signals, which are direction specific, from a base station for a plurality of user equipment situated in different locations.
Figure 4:
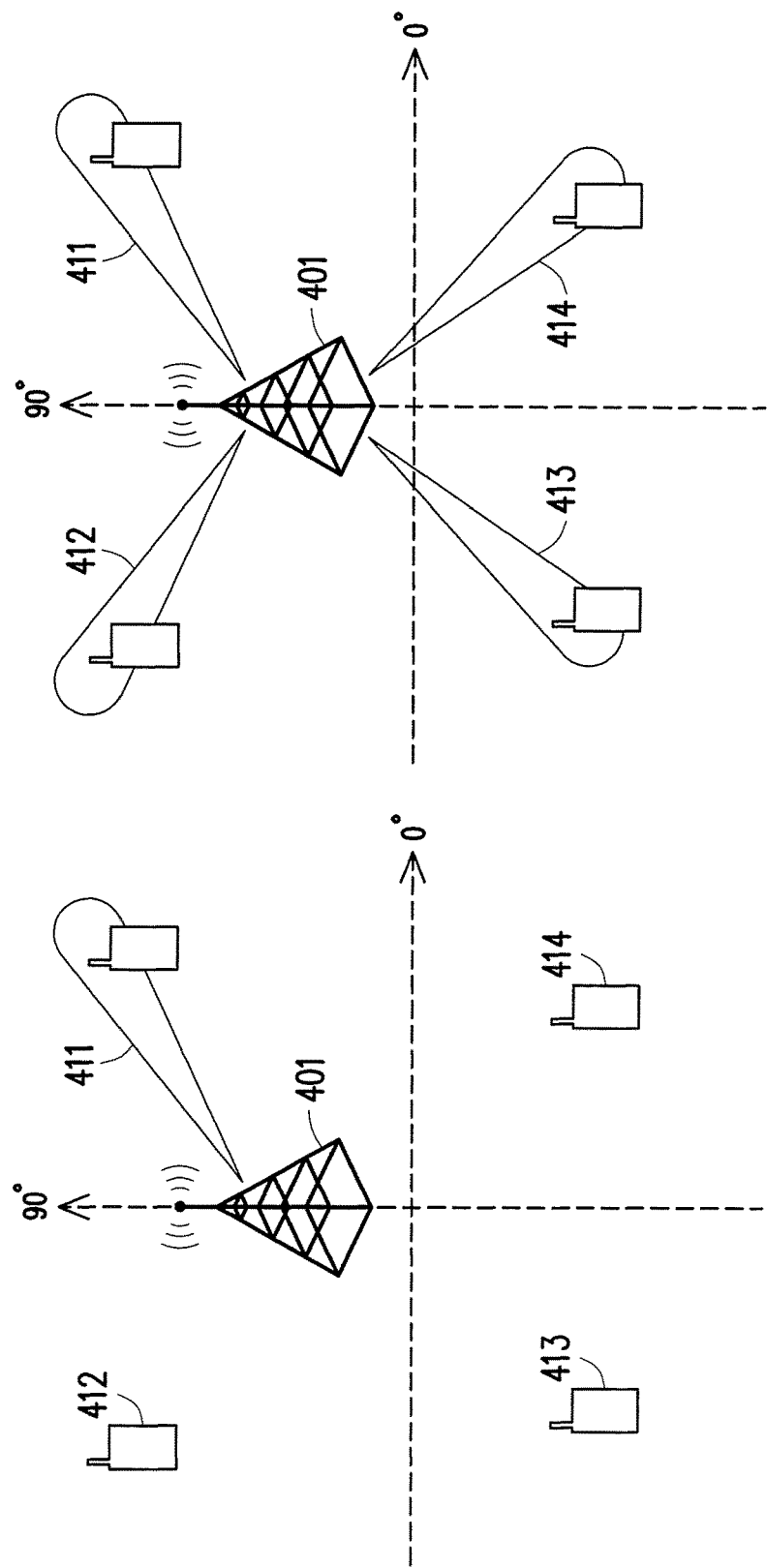
FIG. 4 illustrates an example of transmitting a single directional reference signal from a base station in comparison with transmitting multiple directional reference signals.

Reference will now be made in detail to the present exemplary embodiments of the disclosure, examples of which are illustrated in the accompanying drawings. Wherever possible, the same reference numbers are used in the drawings and the description to refer to the same or like parts.

In view of the mm-Wave characteristics as aforementioned, the disclosure proposes a method and related devices for transmitting a reference signal in a way that achieves resource efficiency in directional transmissions. The objectives of the disclosure is to provide reference signal transmission for the next generation wireless cellular communications systems that use using higher radio frequency such as cm-Wave or mm-Wave. One of the concepts involved is to periodically scanning for the new UE and subsequently collecting information related to RF beams that is used to serve UEs as well as channel conditions. Based on the collected information, a base station with directional antennas may use the proposed method and related devices to achieve beam training and channel quality indicator (CQI) harvesting. Subsequently, a base station may utilize simultaneous transmissions of multiple beams. The base station may also have different reference signal sequences for each distinct beam.

The design of reference signaling protocol for directional mm-Wave communication could be quite challenging since a base station may need to search over a large angular directional space in order to find a UE. For the scenario of using directional transmission signaling from a base station, and omni-directional or directional reception by one or more UEs, the disclosure proposes a method and related device for scanning new UEs and performing channel measurements under the constraints of power, fairness, period between each scanning for new UE, and spacing between each reference signal (RS). Theoretical and simulation results have shown that the disclosure can achieve high resource efficiency especially in small number of UE.

In the disclosure, the reference signal could refer to any of a Primary Synchronization Signal (PSS), a Secondary Synchronization Signals (SSS), a Cell-specific Reference Signal (CRS), a Channel State Information-Reference Signals (CSI-RS), a Discovery Reference Signals (DRS), other new reference signals designed for mmWave communications, other new reference signals designed for channel measurement, and other new reference signals designed for beam searching.

Figure 5A:
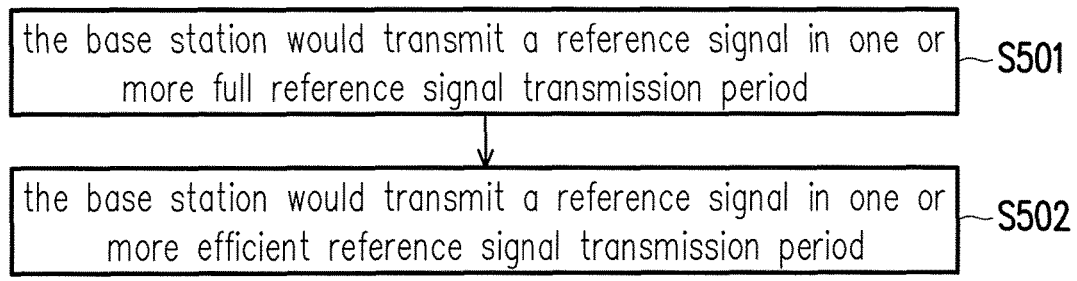
FIG. 5A is a flow chart which illustrates a method of transmitting a reference signal, applicable to a base station in accordance with one of the exemplary embodiments of the disclosure.

FIG. 5A is a flow chart which illustrates the concept of the proposed method of transmitting a reference signal from a base station to a UE. The design of the reference signal could be used at least for a mm-Wave based cellular system. In step S501, the base station would transmit a reference signal in one or more full reference signal transmission period. In step S502, the base station would transmit a reference signal in one or more efficient reference signal transmission period.

Within the full reference signal transmission period, the base station might transmit one reference signal in one directional beam per transmission opportunity. Within the full reference signal transmission period, the base station might transmit reference signals in all directional beams in the cell over more than one transmission opportunities. In one of the exemplary embodiments, one reference signal might be in one directional beam in one time slot. Over the full reference signal transmission period, each beam might transit once. In general, for N_Beam in a cell, a total of N_Beam time slots would be used.

Within the efficient reference signal transmission period, a base station might transmit reference signals in more than one directional beams per transmission opportunity. Reference signals might be transmitted with simultaneous beam transmissions in one time slot. The selection of simultaneous transmission beams may consider the interference level from one beam to another beam such as by selecting two beams that have very low interferences. Within the efficient reference signal transmission period, the base station might transmit reference signals in a subset of all directional beams in the cell over more than one transmission opportunities. For example, the base station might only transmit reference signals on the directional beams intended toward receiving UEs that are registered. For example, the base station might only transmit reference signals on the directional beams (and their adjacent directional beams) intended toward receiving UEs that are registered.

The transmission might be configured in a periodic transmission pattern. For example, full reference signal transmission periods might be configured with a period T_full. Between two full reference signal transmission periods, N_eff efficient reference signal transmission periods could be configured.

The disclosure also provides a signaling method of configuring the reference signal transmission patterns. A base station might use a signaling mechanism to configure the said reference signals. For example, the base station might send a signaling message to a UE to notify the reference signal transmission configuration. For example, the signaling message might use RRC configuration or RRC reconfiguration message to notify the UE about the reference signal configuration. The configuration message might be sent from the control channel in primary cell (e.g. using lower frequency 5G or LTE/LTE+) to configure the directional reference signal transmission in mmWave or cmWave secondary cell. For example, a base station might use broadcast signaling message to configure the reference signal transmission pattern. For example, a base station might transmit the reference signal pattern in system information block (SIB). For example, the SIB might be transmitted periodically in primary cell (e.g. using lower frequency 5G or LTE/LTE+). For example, the SIB might include information of reference signal transmission in mmWave or cmWave secondary cell.

The configuration signaling message might include beam ID, patterns that are represented by a sequence of beam ID, and periodicity of reference signal transmission pattern such as repetition time (or duration) for the full reference signal transmission period, a repetition time (or duration) for the efficient reference signal transmission period, and the number of simultaneous transmission beams during efficient reference signal transmission period. The configuration signaling message may further include any of a table of reference signal transmission pattern, an index of a pre-determined reference signal transmission table, and the content of the reference signal transmission table.

Figure 5B:
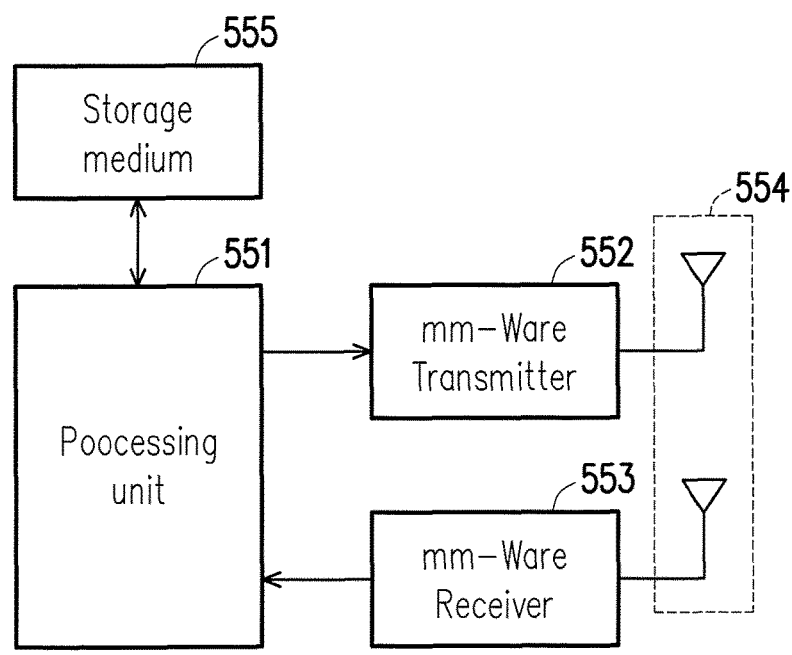
FIG. 5B is a flow chart which illustrates a base station in accordance with one of the exemplary embodiments of the disclosure.

FIG. 5B illustrates a functional block diagram of an exemplary a base station which would include not limited to a processing unit 551, a mm-Wave transmitter 552, a mm-Wave receiver 553, an antenna array 554, and a storage medium 555. The processing unit 552 would perform the method of transmitting a reference signal by controlling the mm-Wave transmitter 552 to transmit a reference signal through the antenna array 554 and by receiving signals via the mm-Wave receiver 553 through the antenna array 554. The process unit 552 may control antenna array 554 to have specific radiation patterns such as the patterns described in the examples of the disclosure. The processing unit 551 may include one or more central processing unit (CPU), micro-controller units (MCU), or other types of programmable integrated circuits. The storage medium may contain one or more storage devices for storing not limited to programming codes used by the processing unit 551 and for storage information not limited to beam IDs, periodicity of reference signal transmission patterns, a table of reference signal transmission pattern, an index of a pre-determined reference signal transmission table, the content of the reference signal transmission table, and so forth.

Figure 6A:
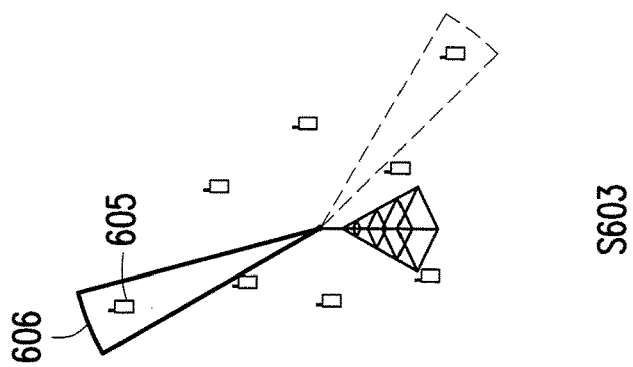
FIG. 6A~6C illustrates a first exemplary embodiment of the proposed method of transmitting a reference signal with various levels of details.
Figure 6A:
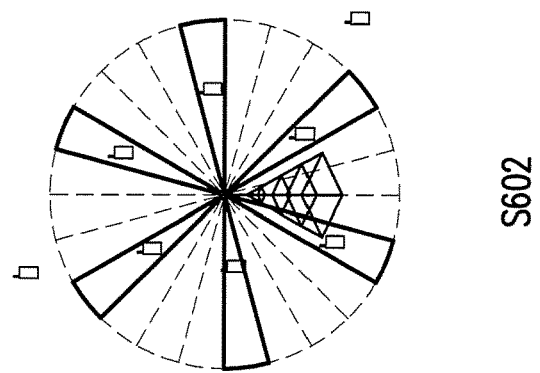
Figure 6A:
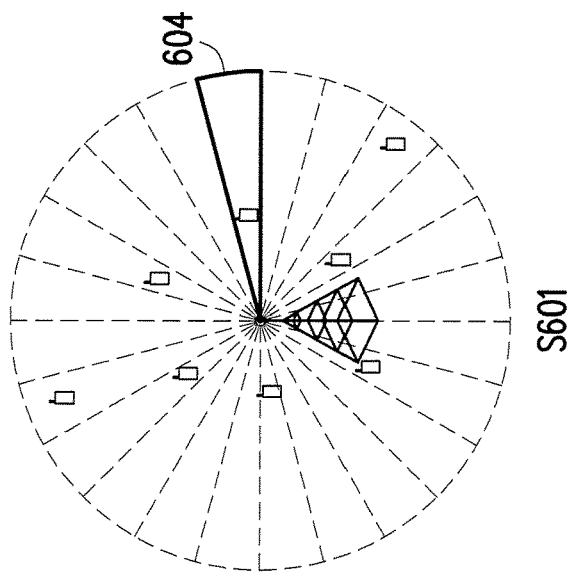

To further elucidate the concept of FIG. 5A & FIG. 5B, FIG. 6A illustrates the first exemplary embodiment of the proposed method of transmitting a reference signal. For this exemplary embodiment, a full reference signal transmission would undergo three steps. In step S601 (full scanning phase), the base station would transmit a reference signal by sweeping through all 360 degrees in 24 different time slots, and thus the sweep would cover a range of 360/24=15 degrees per time slot. The purpose of S601 is to concentrate power to discover all UEs that can be served by the base station. After the reference signal has been received by a UE, the UE would perform a channel measurement based on the reference signal and would subsequently transmit the measurement result back to the base station. After receiving the measurement result, the base station would know the existence of the UE.

In step S602 (multiple scanning phase), the base station would transmit the reference signal in a more efficient manner by sweeping through multiple discrete angles as shown in FIG. 6A. Since multiple beams are used in step S602, each beam will have less power than the beam used in step S601. However, since multiple beams are used, the base station would be able to transmit reference signals to more UEs than in step S601.

In step S603 (compensation phase), the base station would attempt to transmit a reference signal to UEs that are not covered in step S602 by transmitting the reference signal with a single beam. For example, assuming that the UE 605 is cannot be reached in step S602 during the multiple scanning phase, in step S603, the base station would attempt the transmit the reference signal to the UE 605 with a single beam 606 that has more power than any single beam used in step S602. It should be noted that whenever the base station would need an update of the channel conditions experienced by UEs that are served by the base station, the base station may transmit reference signal by repeating step S602 and step S603.

Figure 6B:
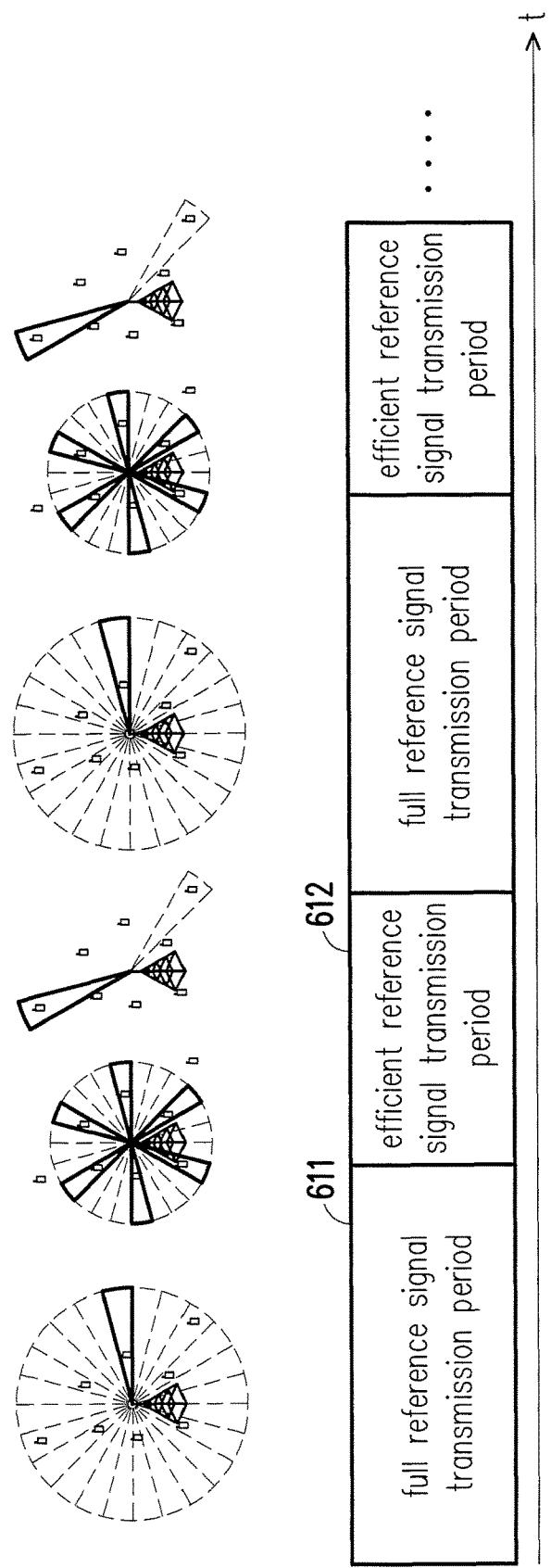

FIG. 6B illustrates the iteration of the steps S601~S603 in a time scale. The full scanning phase of step S601 could be performed in a full reference signal transmission period 611. Right after the full reference signal transmission period would be the efficient reference signal transmission period 612 during which step S602 and step S603 would be executed. After the efficient reference signal transmission period 612, another repetition of the full reference signal transmission period and efficient reference signal transmission period may commence.

Figure 6C:
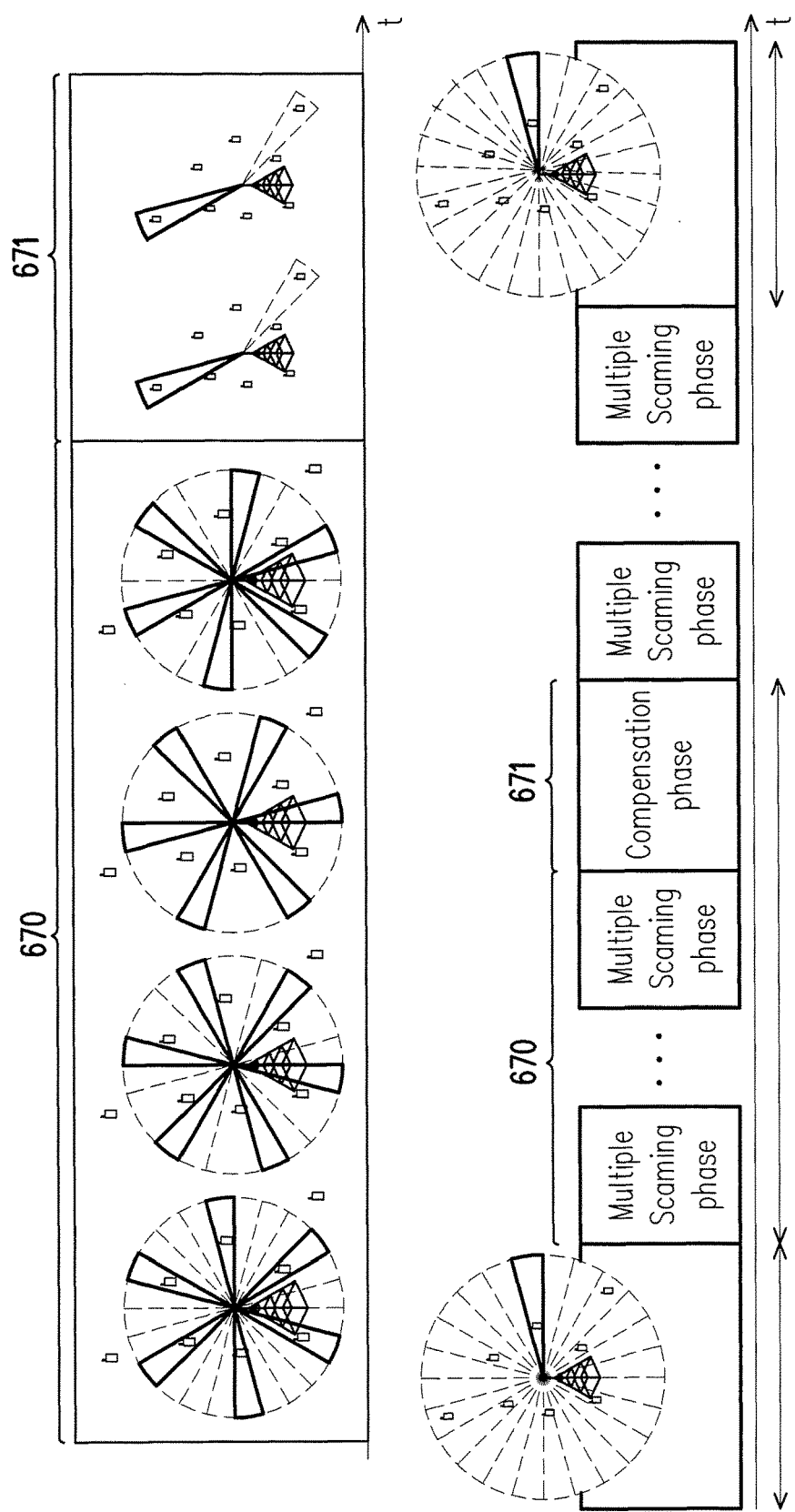

FIG. 6C illustrates first exemplary embodiment of the proposed method of transmitting a reference signal with further details. For the first exemplary embodiment, an efficient reference signal transmission period would include a multiple scanning phase 670 in which step S602 is executed and a compensation phase 671 in which step S603 is executed. 612 FIG. 6C shows that after performing step S601 in the full reference signal transmission period, step S602 would be performed during the multiple scanning phase 670 which would require 4 time slots to scan 360 degrees assuming that there are 6 beams used per scan and a total of 24 time slots for a complete sweep. During the compensation phase 671 in which step S603 is performed, in this particular example, there are two time slots used to scan two UEs which cannot be reached during the multiple scanning phase 670. After the compensation phase 671, another repetition of the multiple scanning phase 670 may commence.

Figure 7:
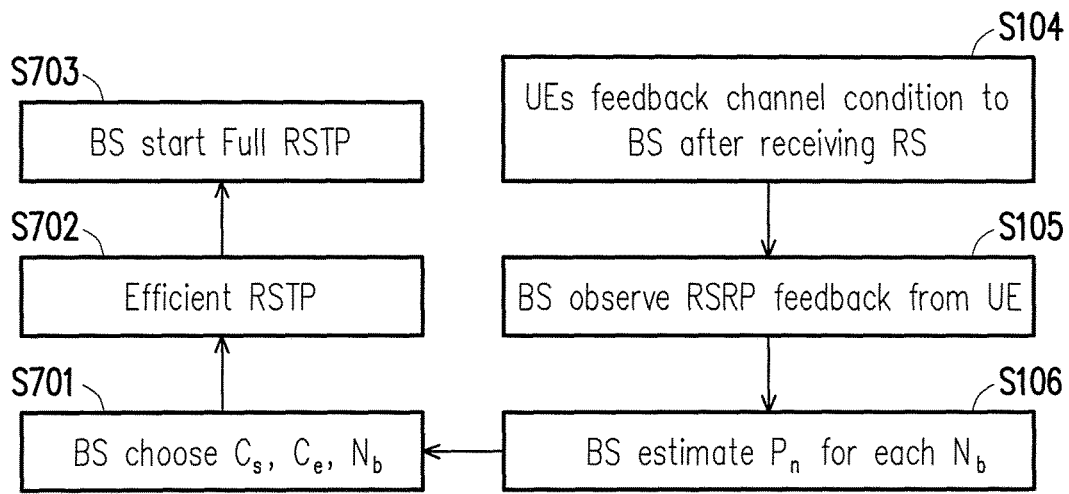
FIG. 7 illustrates a procedure of transmitting a reference signal in accordance with one of the exemplary embodiments of the disclosure.

An overall process of the first exemplary embodiment is shown by the flow chart of FIG. 7. First a brief description of the procedure is provided. Based on the reference signal fixed transmission power assumption, a reference signaling procedure could be designed using directional antenna for cellular communication. This procedure would restrict power consumption in reference signal (RS) as well as enhance the expected number of reference signals received for each UE. The directional transmissions of RS from base station, and omni-directional or directional reception by UE would be considered, and each base station would periodically broadcast a RS. A UE would search for the base station by listening RS from base station. UE would report the RS measurement to base station after receiving RS. If a mmWave system would need to coexist with a LTE or other microwave cellular systems, the primary cell (PCell) would operate in the microwave range, and the BS may transmit a mm-Wave RS in secondary cell (SCell) while each UE would report a RS measurement in PCell. For a standalone mmWave system, a UE may report RS measurement in mm-Wave. The transmission and reception direction beam alignment procedure would be needed in UE to report in mm-Wave. RS resource blocks could be pre-configured and classified into Full Reference Signal Transmission Period (e.g. 611) for discovering UE and Efficient Reference Signal Transmission Period (e.g. 612) for updating the channel condition shown in FIG. 6B. One or more Efficient RSTP could be configured semi-statically between two Full RSTP. The reference signal transmission is configured with periodic transmission pattern. A BS may send a signaling message to UE to notify the reference signal transmission configuration. The signaling message would be able to include how many beam simultaneously transmit to allow CQI estimation at the UE side. If mm-Wave system would need to coexist with a microwave system, the signaling message may use microwave to notify the UE about the reference signal configuration. On the other hand, if the mm-Wave is a standalone system, the signaling message would be transmitted in mmWave.

Each step of FIG. 7 is explained in more detail. In step S703, a base station may start the full RSTP (e.g. 611). The base station may sweep through all angles one-by-one to transmit a RS by using different RS sequences in order to distinguish one beam from another. In step S704, The UEs may report channel conditions which is measured from RS through a control channel after receiving the RS. The base station may determine which beam would best to serve each UE based on the UE's report on signal strengths of the detected beam RS. In step S705, a base station may receive UEs reference signal received power (RSRP) feedback to estimate how many UEs can received RS for each transmission power level. BS also would know how many UEs are within its coverage.

In step S706, a base station may estimate scanning probability Pn for each beam number Nb. A UE is reachable during Scanning Phase with probability Pn depending on simultaneously transmit beam number. Nb during the multiple scanning phase (e.g. 670). A base station may calculate the power reduction in the beam for transmitting RS in beamforming multiple beam to estimate how many UEs will received enough RSRP. Therefore, a base station would be able to calculate Pn by Nb.

In step S701, a base station would choose Cs, Ce, and Nb which are further explained as follows. There could be two constraints to decide how many full reference signal transmission period (e.g. 611) cycles and efficient RSTP (e.g. 612) cycles. The first constraint is fair constraint which is RS receiving times ratio of large number of RS received for some UEs to small number of RS received for some UEs. UEs with bad channel condition can only receive RS in Compensation Phase. That is, UEs with bad channel condition can only update channel condition after receiving RS in Compensation Phase. Fair constraint would dominantly restrict Scanning Phase cycles Cs. The second constraint is the time between two Full RSTPs. The second constraint would dominantly restrict Efficient RSTP cycles Ce. A base station would optimize expected number of receiving RS per resource for each UE by selecting Nb and considering those constraints.

In step S702, the efficient RSTP would be executed. In terms of efficient RSTP, resource blocks could be pre-configured by a base station and can be classified into multiple scanning phase (e.g. 670) and compensation phase (e.g. 671). The compensation phase could be configured between two scanning phase cycles in efficient RSTP. A base station may scan through all beams with multiple beams at a time in a multiple scanning phase. Although there is less power per beam in comparison to the Full RSTP of step S703. Therefore, there may exist some unreachable UEs such as UE 605 as shown in FIG. 6A. In the compensation phase (e.g. 671), a base station may use a single beam to transmit a RS for UEs which cannot be reached during the multiple scanning phase (e.g. 670). The base station, based on the RSRP feedback it receives in Full RSTP, may decide how many beams to transmit in multiple scanning phase (e.g. 670) and compensation phase (e.g. 671).

Figure 8:
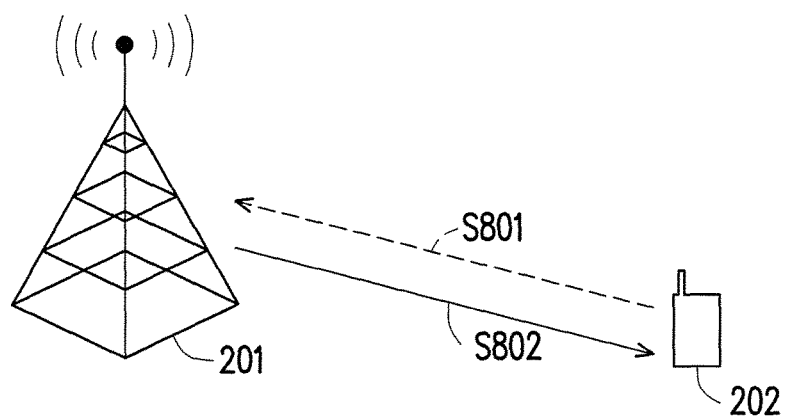
FIG. 8 illustrates a revised procedure of transmitting a reference signal in accordance with one of the exemplary embodiments of the disclosure.

FIG. 8 illustrates a revised procedure of transmitting a reference signal in accordance with one of the exemplary embodiments of the disclosure. In step S802, a base station may transmit a reference to the UE. In response to the step S802, in step S801, the UE may transmit a feedback to the base station. The revision is to include an additional indication of transmission power in the transmission of step S802 which would contain at least a reference signal as well as the indication. In a simple case, the indication may also indicates the number of simultaneously transmitted beams, and thus the indication is common to all the beams. In a more sophisticated case, the indication could be beam-specific, so that individual beams would have different transmission powers. By doing so would allow the estimation of channel quality indicator (CQI) at UE side. If the estimated CQI is related to signal to interference plus noise ratio (SINR) (or in the form of MCS index), some normalization could be needed for the received reference signal with different Tx power before the received reference signal is input for filtering for robust estimation. The normalization could be based on the signaled transmit power. In step S801, the UE may report the reference signal measurement to a base station. The reporting could be done in an out-of-band control channel or an mmWave control channel.

Figure 9A:
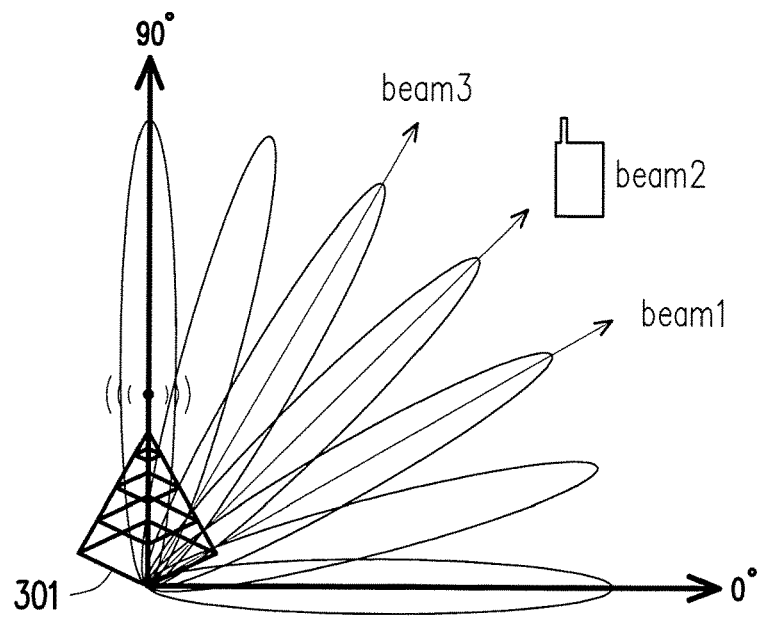
FIG. 9A & FIG. 9B illustrates different ways of distinguish among transmission beams in accordance with one of the exemplary embodiments of the disclosure.
Figure 9B:
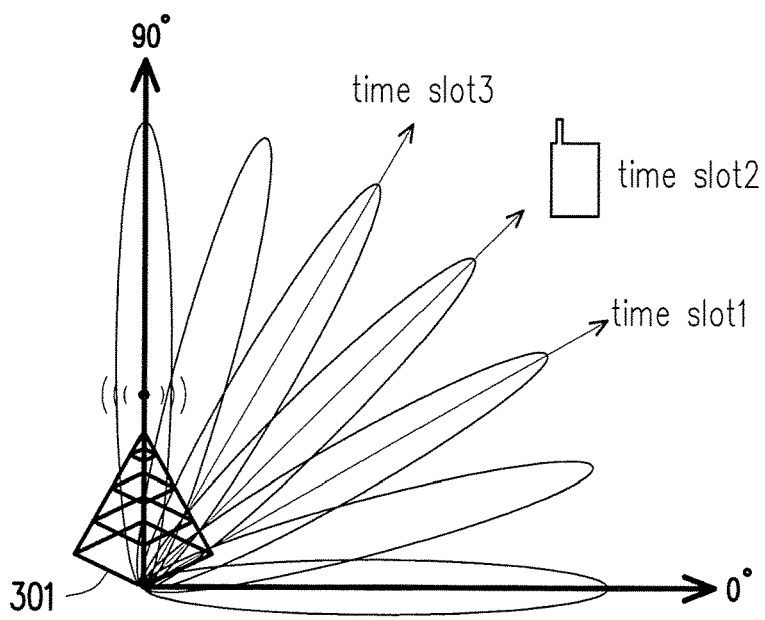

FIG. 9A & FIG. 9B illustrates different ways of distinguish among transmission beams in accordance with one of the exemplary embodiments of the disclosure. The disclosure proposes an explicit way and an implicit way to design reference signal. The explicit way is illustrated by FIG. 9A, and the implicit way is illustrated by FIG. 9B. For the explicit way, identification information could be carried in the reference signal to distinguish the reference signal from different beams. For example, different reference signal sequences could be used distinguish beams. Similarly, the same sequence could be used but beam index could be carried in a data field of a physical control channel. For the implicit way, a base station would transmit the reference signal by using different time slots so that a UE would be able to distinguish among the transmission beams based on the receiving time slots. The configuration of reference signal patterns of transmission in different time slots could be sent via, for example, an out-of-band control plane.

Figure 10:
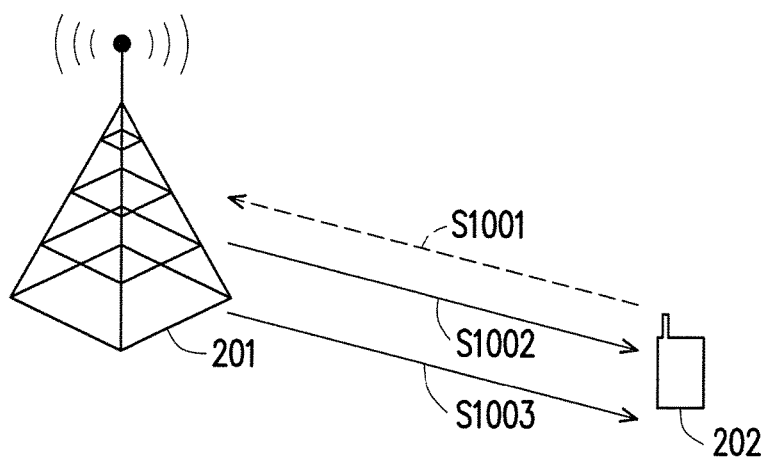
FIG. 10 illustrates transmitting a reference signal in a standalone system or non-standalone system in accordance with one of the exemplary embodiments of the disclosure.

FIG. 10 illustrates transmitting a reference signal in a standalone system or non-standalone system in accordance with one of the exemplary embodiments of the disclosure. In step S1002, a base station would transmit a reference signal to a UE. In step S1003, the base station may optionally transmit a reference signal configuration to the UE for the purpose of configuring reference signal patterns. In step S1001, the UE would transmit a CQI feedback to the base station in response to step S1002 and step S1003. For a standalone system, the UE would likely use the explicit way of distinguishing a reference signal as shown in FIG. 9A. The UE in step S1001 would transmit the CQI feedback in mm-Wave band. For a non-standalone system, the UE would likely use the implicit way of distinguishing a reference signal as shown in FIG. 9B. The UE in step S1002 would transmit the CQI feedback in an out-of-band channel such as a microwave frequency instead of a mm-Wave band.

The disclosure has provided three different reference signal transmission phases. The first phase is the full reference signal transmission phase in which one beam is transmitted in one transmission opportunity. In other words, N beams are transmitted in N transmission opportunities. The second phase is a multiple scanning phase with with multiple beams in which two or more beams are transmitted in one transmission opportunity. For example, if 2 beams are transmitted in each transmission opportunity, N beams are transmitted in N/2 transmission opportunities. The third phase is the compensation phase in which one beam is transmitted in one transmission opportunity. The third phase is executed when the base station has known the approximate location of a UE which the base station wants to reach but could not reach during the second phase.

However, it should be noted that different permutations of the transmission phases are possible. For example the first exemplary embodiment include the first phase, second phase, and the third phase. However, for different situations, any of the three phases might not be needed. Also for other situations, some of the phases might be repeated a number of times before starting another phase. For example, if all UEs can be reached during the second phase, the third phase is not required. For another example, if none of the UEs can be used during the second phase, then a mode of transmission would only include the first phase and the third phase.

Figure 11:
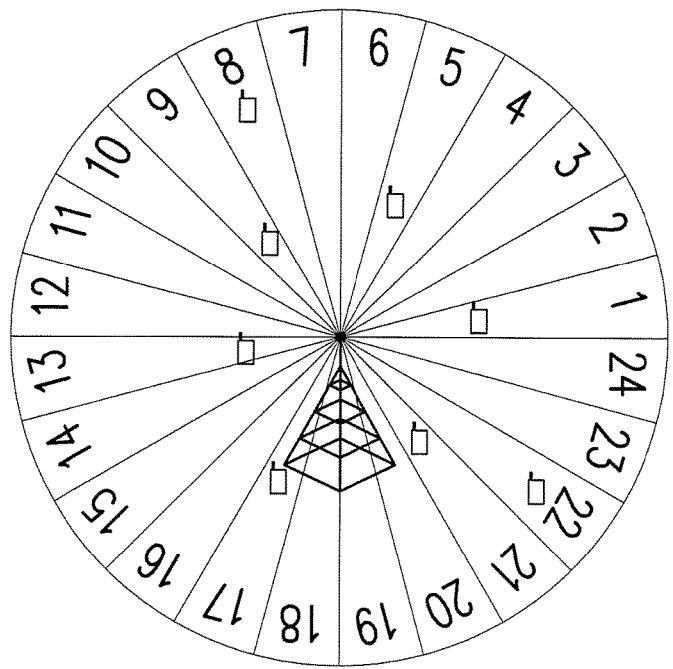
FIG. 11 illustrates a first example of a full reference signal transmission period in accordance with one of the exemplary embodiments of the disclosure.
Figure 11:
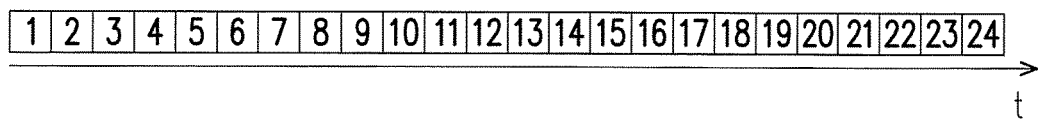

FIG. 11 illustrates a first example of a full reference signal transmission period in accordance with one of the exemplary embodiments of the disclosure. During the full reference signal transmission period, a base station would sweep through all discrete range of angles with directional beams one by one. According to FIG. 11, it can be seen that there are 24 different discrete range of angles and 24 different time slot. Within each time slot, one beam will sweep through a specific range of angles.

Figure 12:
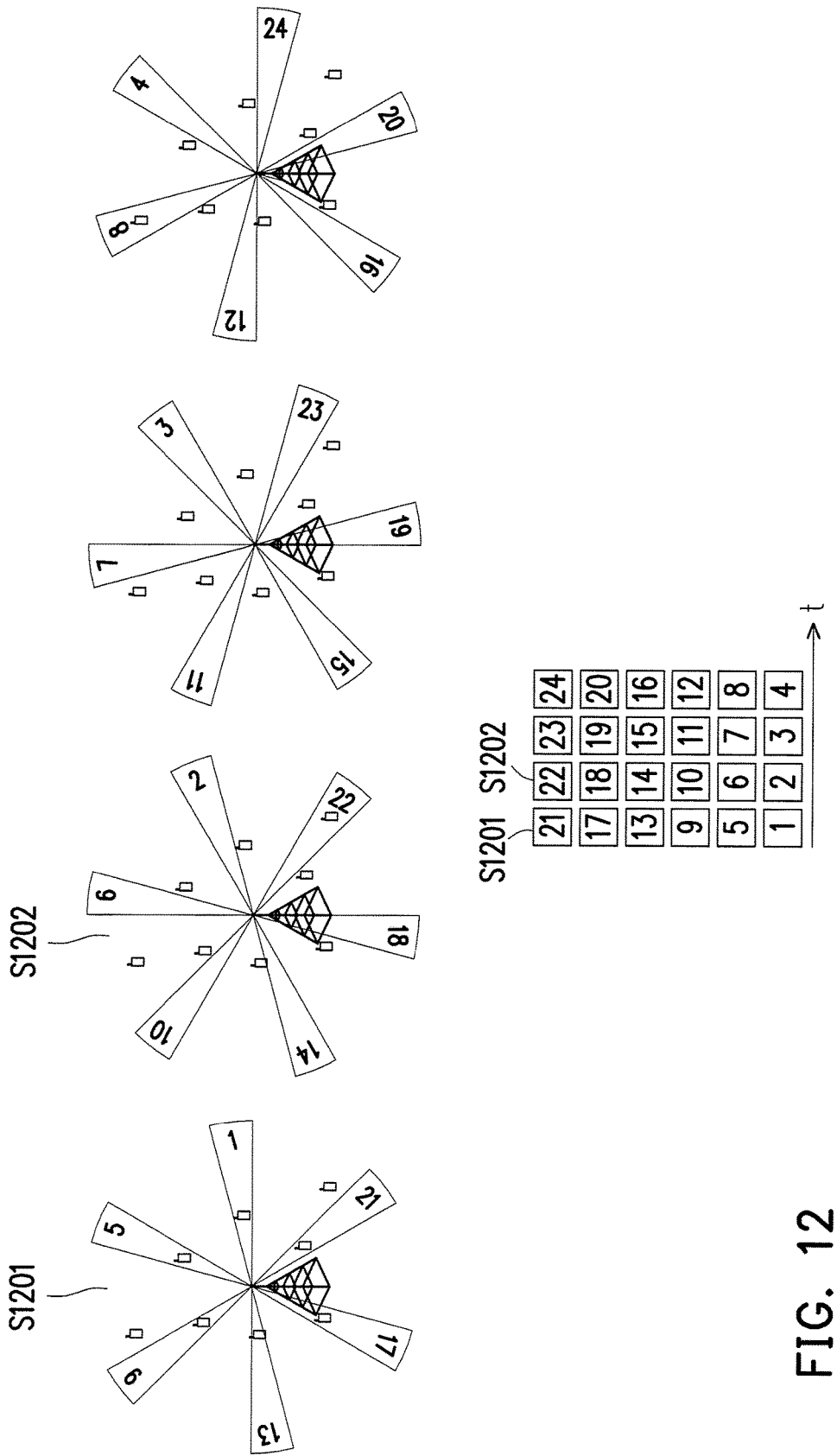
FIG. 12 illustrates an example of various reference signal transmission phases in accordance with one of the exemplary embodiments of the disclosure.

FIG. 12 illustrates an example of various reference signal transmission phases in accordance with one of the exemplary embodiments of the disclosure. For this example, there are 4 time slots with 6 distinct directional beams scanning each range of angles during each time slot in order to scan through 24 discrete ranges of angles. Each discrete range of angles would be 360/24=15 degrees in this example. It is assumed that each different beam would have a beam number. Since there are 24 discrete ranges of angles, there are 24 beams numbered from 1 to 24. In step S1201, a reference signal would be transmitted through a first set of beams, namely 1, 5, 9, 13, 17, and 21. In step S1202, a reference signal would be transmitted through a first set of beams, namely 2, 6, 10, 14, 18, and 22.

Figure 13:
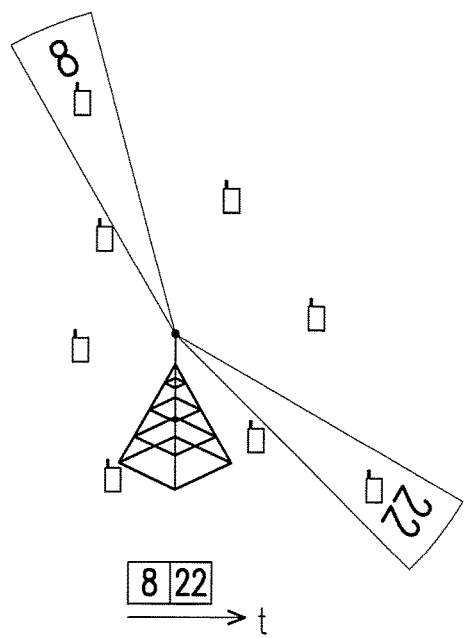
FIG. 13 illustrates a first example of a compensation phase in accordance with one of the exemplary embodiments of the disclosure.

FIG. 13 illustrates a first example of a compensation phase in accordance with one of the exemplary embodiments of the disclosure. Assuming that there are two UEs that cannot be reached during the multiple scanning phase of FIG. 12 and the base station knows the proximate locations of these two UEs, then in a first time slot, beam number 8 would be used to reach one of the two UEs, and in a second time slot, beam number 22 would be used to reach the other one of the two UEs. Since only one beam would be used per sweep, each beam (e.g. 8 or 22) would have a longer range than any beams used in FIG. 12.

Figure 14:
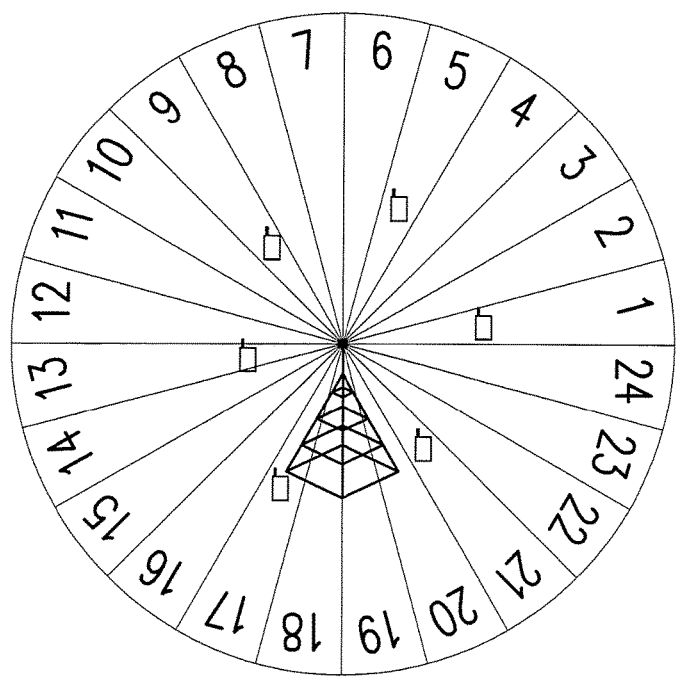
FIG. 14 illustrates a second example of full reference signal transmission period in accordance with one of the exemplary embodiments of the disclosure.
Figure 14:
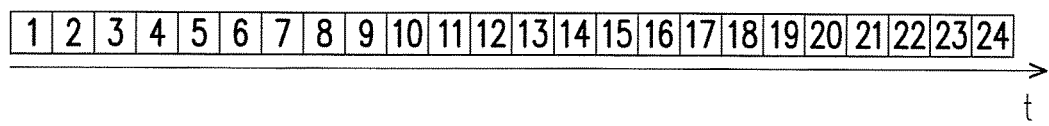
Figure 15:
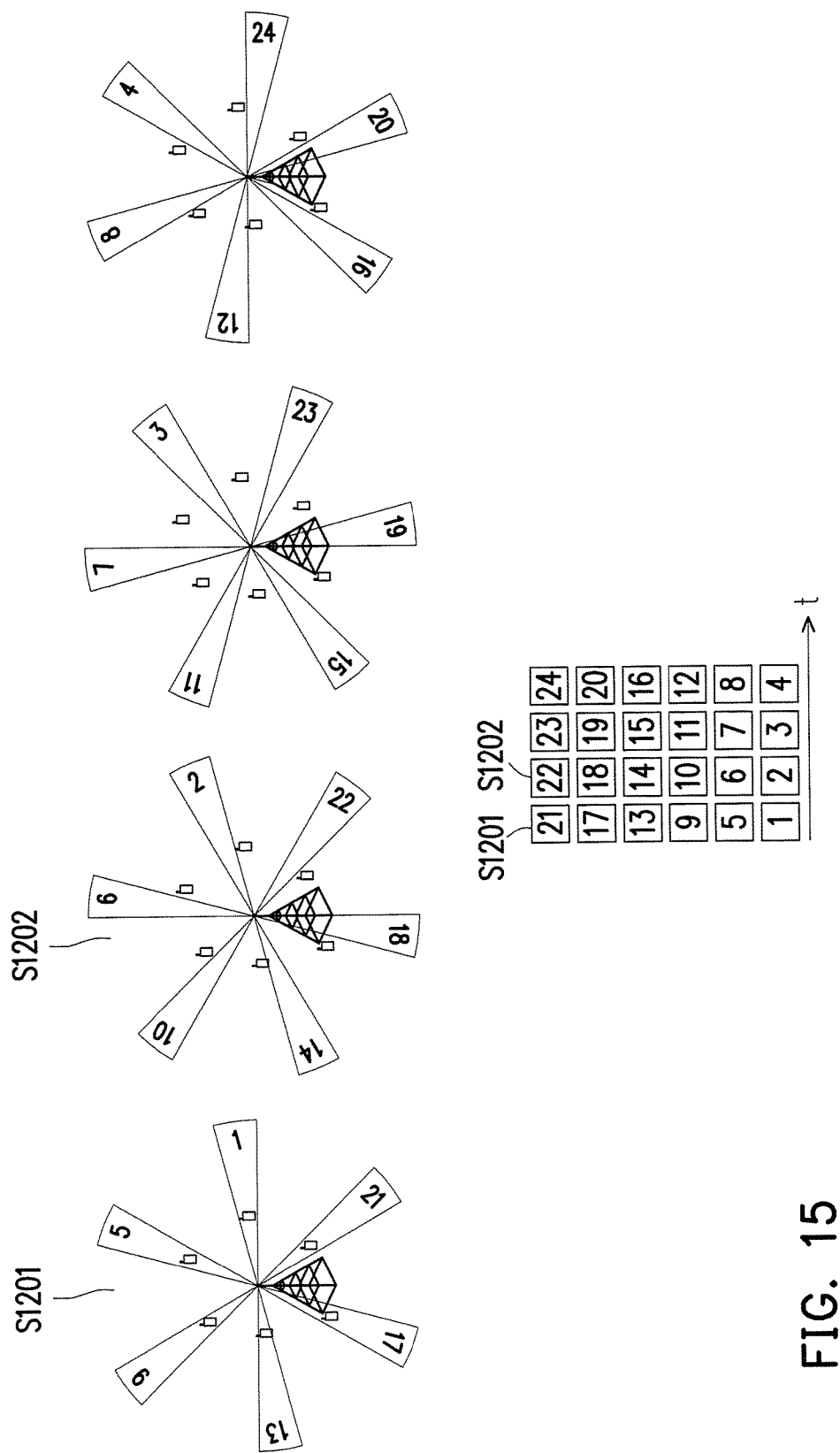
FIG. 15 illustrates a second example of a multiple scanning phase in accordance with one of the exemplary embodiments of the disclosure.

FIG. 14~15 illustrates a second example of full reference signal transmission period in accordance with one of the exemplary embodiments of the disclosure. For this example, there would be a full scanning phase as shown in FIG. 14 and a multiple scanning phase as shown in FIG. 15. However, there will be no compensation phase at all because the multiple scanning phase is able to reach all UEs that are served by the base station.

Figure 16:
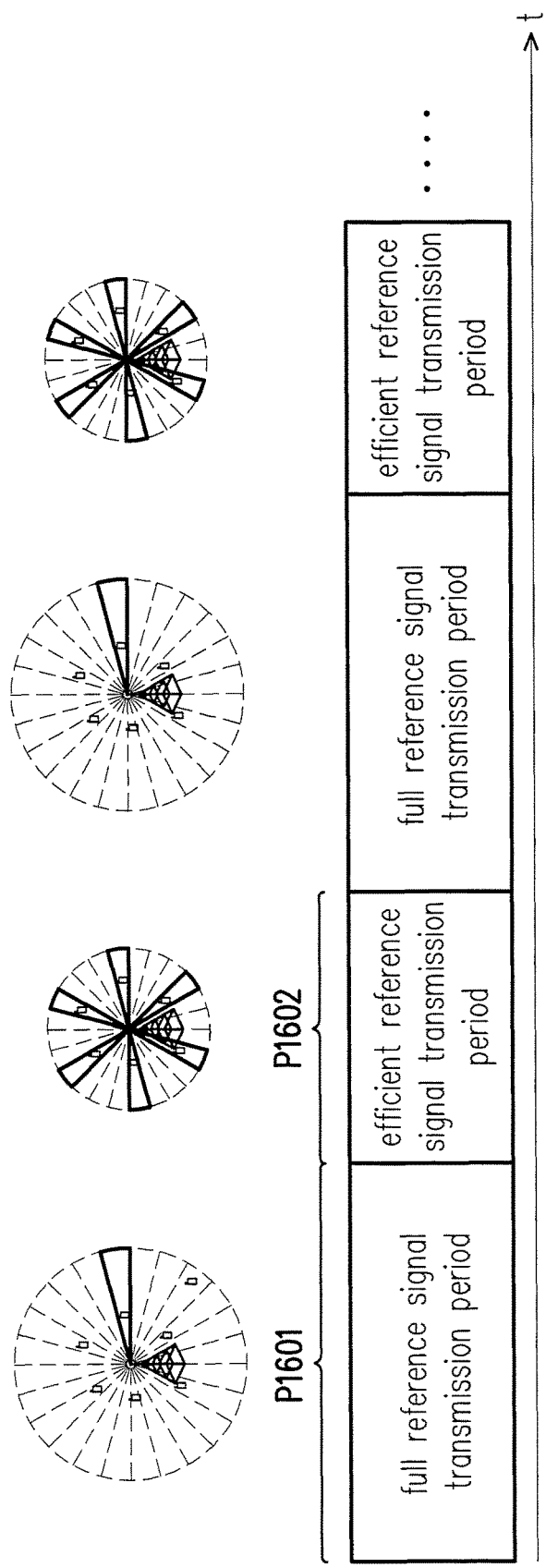
FIG. 16 illustrates using efficient reference signal transmission periods is used to update channel condition in accordance with one of the exemplary embodiments of the disclosure.
Figure 17:
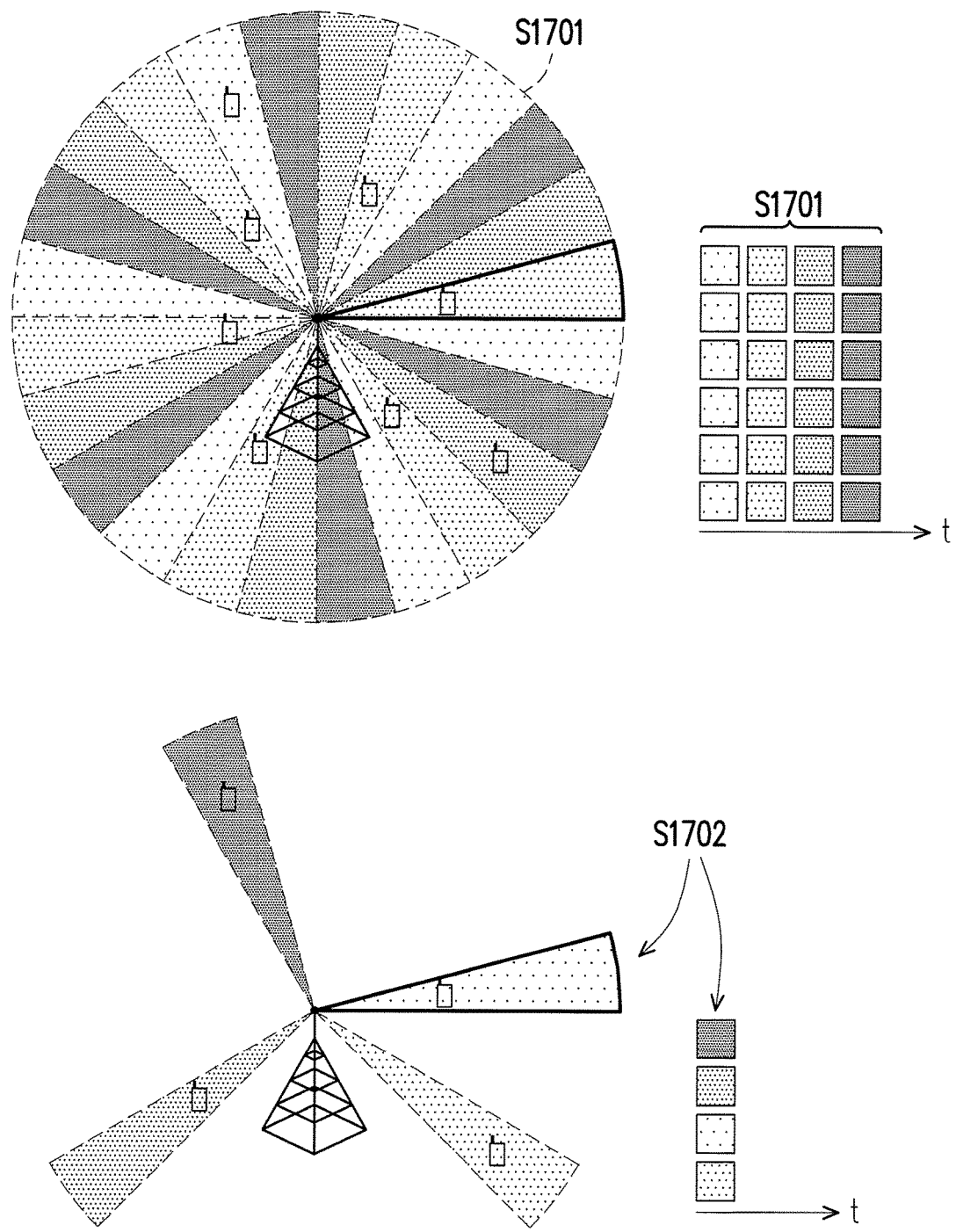
FIG. 17 illustrates a second exemplary embodiment of the proposed method of transmitting a reference signal.
Figure 18:
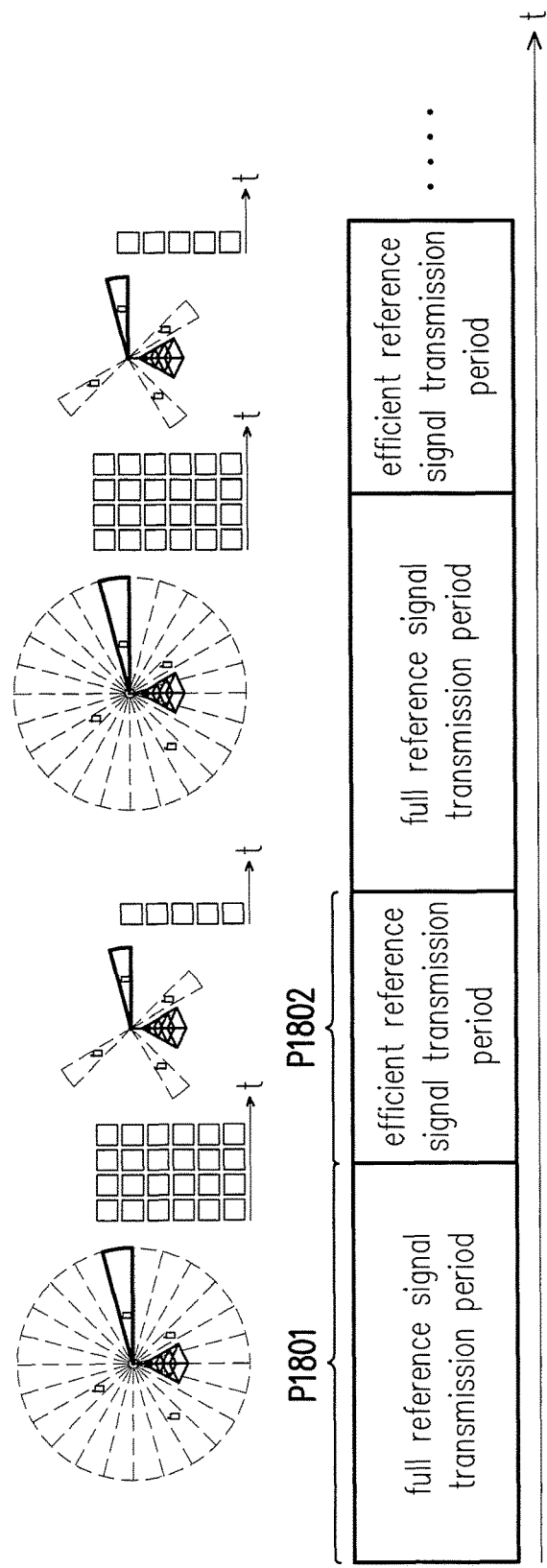
FIG. 18 illustrates different transmission periods of the second exemplary embodiment of the proposed method of transmitting a reference signal.

FIG. 16~FIG. 18 illustrate a second exemplary embodiment of the proposed method of transmitting a reference signal. As shown in FIG. 16, the second exemplary embodiment would include a full reference signal transmission phase P1601 and an efficient reference signal transmission phase P1602. However the contents of these phases are different from the first exemplary embodiment. It is assuming that a fixed reference signal power is used for transmitting the reference regardless of whether one beam is transmitted or multiple beams are transmitted simultaneously. However, considering the issue of mobility, the periodicity for discovering UEs could be very small if UEs are one the move. Therefore, by considering the issue of mobility, it is possible that a full scanning period could not be afforded. The transmission beam can be distinguished explicitly/implicitly in similar ways as mentioned earlier, but the periodicity may need to be quite small to reduce beam training efforts. The main reason for the second exemplary embodiment is to finish mobility tracking and discover new devices that just come into the coverage of the base station in one shot. Therefore, a two-phased approach is proposed as shown in FIG. 17.

FIG. 17 illustrates a second exemplary embodiment of the proposed method of transmitting a reference signal. In step S1701, a multiple scanning phase would be performing by to quickly sweep through all 360 degrees by simultaneously scanning multiple beams per time slot. In the example of FIG. 17, there are 4 time slots and 24 beams and thus there are 6 beams transmitted per time slot. This purpose of the multiple scanning phase is mostly to discover new users or new locations of existing users. In step S1702, one or more beams could be used to identify known users from the multiple scanning phase of step S1701. The quantity of the one or more beams of step S1702 would be a subset of the quantity of beams used in step S1701. In this example, assuming that the base station has identified four users from step S1701, then in step S1702, the base station would transmit 4 beams simultaneously to track these 4 users in a time slot.

FIG. 18 shows a comprehensive figure by combining FIG. 16 and FIG. 17. In During the full reference signal transmission period P1801, step S1701 could be performed. During the efficient reference signal transmission period P1802, step S1702 could be performed. After the efficient reference signal transmission period P1802, another iteration of a full reference signal transmission period and an efficient reference signal transmission period could be performed for one or more times. It should be noted that step S1702 could be performed multiple times during any efficient reference signal transmission period, and the periodicity of the step S1702 could be configured by an explicit signaling.

In view of the aforementioned descriptions, the disclosure is suitable for being used in a wireless communication system that uses mm-Wave technology and is able to transmit reference signals in an effective and efficient manner.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of transmitting a reference signal applicable to a base station, the method comprising:

transmitting a reference signal by using a directional antenna emitting a first radiation pattern of one or more beams covering $$\frac{360}{N}$$

degrees per one of N time slots during a first phase of a full sweeping period, wherein N≥2 transmitting the reference signal, in response to transmitting the reference signal by using the directional antenna which has the first radiation pattern, by using the directional antenna emitting a second radiation pattern of multiple beams having different angles simultaneously covering a total of $$\frac{360}{M}$$

degrees of angles per one of M time slots during a second phase of the full sweeping period, wherein N>M≥1, wherein a beam of the first radiation pattern covers a longer distance than any of the multiple beams of the second radiation pattern;

receiving a channel measurement of a user equipment in response to transmitting the reference signal; and
   determining a direction of the user equipment in response to receiving the channel measurement.

2. The method of claim 1, wherein transmitting the reference signal in the second phase comprising:

transmitting the reference signal in multiple beams covering a first set of discrete angles during a first time slot of the M time slots of the second phase; and
   transmitting the reference signal in multiple beams covering a second set of discrete angles during a second time slot of M time slots of the second phase, wherein the first set of discrete angles does not overlap with the second set of discrete angles.

3. The method of claim 1 further comprising:

transmitting the reference signal by using the directional antenna which has a third radiation pattern of a beam covering a specific angle in response to the user equipment not covered by the second radiation pattern, wherein a beam of the third radiation pattern covers a longer distance than any of the multiple beams of the second radiation pattern.

4. The method of claim 1, wherein the step of transmitting the reference signal by using the directional antenna which has the second radiation pattern repeats several times after the step of transmitting the reference signal by using the directional antenna which has the first radiation pattern.

5. The method of claim 1, wherein transmitting the reference signal by using the directional antenna emitting the first radiation pattern of one or more beams covering $$\frac{360}{N}$$

degrees per one of N time slots during a first phase of a full sweeping period comprising:

transmitting the reference signal by using the direction antenna emitting the first radiation pattern of multiple beams covering $$\frac{360}{N}$$

degrees per one of N time slots;
   receiving a channel measurement of an user equipment in response to transmitting the reference signal; and
   determining a direction of the user equipment in response to receiving the channel measurement.

6. The method of claim 5, wherein the second radiation pattern is a subset of the first radiation pattern.

7. The method of claim 1, further comprising:

transmitting a different reference signal in response to receiving the channel measurement, wherein the reference signal is transmitted by using the directional antenna emitting the first radiation pattern of one or more beams covering $$\frac{360}{N}$$

degrees per one of N time slots during a first phase of a different full sweeping period.

8. The method of claim 1, wherein the reference signal is for is for a mm-Wave based cellular system and comprises reference signal configuration information or reference signal power information.

9. A base station comprising:

a transmitter; and
   a processor coupled to the transmitter and is configured at least for:

transmitting, via the transmitter, a reference signal by using a directional antenna emitting a first radiation pattern of one or more beams covering $$\frac{360}{N}$$

degrees per one of N time slots during a first phase of a full sweeping period, wherein N≥2 and transmitting, via the transmitter, the reference signal, in response to transmitting the reference signal by using the directional antenna which has the first radiation pattern, by using the directional antenna emitting a second radiation pattern of multiple beams having different angles simultaneously covering a total of $$\frac{360}{M}$$

degrees of angles per one of M time slots during a second phase of the full sweeping period, wherein N>M≥1; wherein a beam of the first radiation pattern covers a longer distance than any of the multiple beams of the second radiation pattern;

receiving, via the receiver, a channel measurement of a user equipment in response to transmitting the reference signal; and determining a direction of the user equipment in response to receiving the channel measurement.

10. The base station of claim 9, wherein the processor is configured for transmitting the reference signal in the second phase comprising:

transmitting, via the transmitter, the reference signal in multiple beams covering a first set of discrete angles during a first time slot of the M time slots of the second phase; and transmitting, via the transmitter, the reference signal in multiple beams covering a second set of discrete angles during a second time slot of M time slots of the second phase, wherein the first set of discrete angles does not overlap with the second set of discrete angles.

11. The base station of claim 9, wherein the processor is further configured for:

transmitting, via the transmitter, the reference signal by using the directional antenna which has a third radiation pattern of a beam covering a specific angle in response to the user equipment not covered by the second radiation pattern, wherein a beam of the third radiation pattern covers a longer distance than any of the multiple beams of the second radiation pattern.

12. A method of receiving a reference signal applicable to a user equipment, the method comprising:

receiving a reference signal transmitted in a first radiation pattern of one or more beams covering $$\frac{360}{N}$$

degrees per one of N time slots during a first phase of a full sweeping period, wherein N≥2;

in response to receiving the reference signal transmitted in the first radiation pattern, receiving the reference signal transmitted in a second radiation pattern of multiple beams having different angles simultaneously covering a total of $$\frac{360}{M}$$

degrees of angles per one of M time slots during a second phase of the full sweeping period, wherein N>M≥1;

receiving the reference signal transmitted in a third radiation pattern of a beam covering a specific angle in response to the second radiation pattern not reaching the user equipment, wherein a beam of the third radiation pattern covers a longer distance than any of the multiple beams of the second radiation pattern;

discerning the reference signal based on an ID of the first radiation pattern;

performing a channel measurement based on the reference signal; and transmitting the channel measurement in a same frequency as the reference signal.

13. The method of claim 12, wherein a beam of the first radiation pattern covers a longer distance than any of the multiple beams of the second radiation pattern.

14. A user equipment comprising:
a receiver;
a transmitter; and
a processor coupled to the receiver and configured for:
receiving, via the receiver, a reference signal transmitted in a first radiation pattern of one or more beams covering $$\frac{360}{N}$$

degrees per one of N time slots during a first phase of a full sweeping period, wherein N≥2;

in response to receiving the reference signal transmitted in the first radiation pattern, receiving, via the receiver, the reference signal transmitted in a second radiation pattern of multiple beams having different angles simultaneously covering a total of $$\frac{360}{M}$$

degrees of angles per one of M time slots during a second phase of the full sweeping period, wherein N>M≥1;

receiving, via the receiver, the reference signal transmitted in a third radiation pattern of a beam covering a specific angle in response to the second radiation pattern not reaching the user equipment, wherein a beam of the third radiation pattern covers a longer distance than any of the multiple beams of the second radiation pattern;

discerning the reference signal based on a time slot of the first radiation pattern;

performing a channel measurement based on the reference signal; and transmitting, via the transmitter, the channel measurement in a different frequency as the reference signal.

15. A user equipment comprising:
a receiver;
a transmitter; and
a processor coupled to the receiver and configured for:
receiving, via the receiver, a reference signal transmitted in a first radiation pattern of one or more beams covering $$\frac{360}{N}$$

degrees per one of N time slots during a first phase of a full sweeping period, wherein N≥2;

in response to receiving the reference signal transmitted in the first radiation pattern, receiving, via the receiver, the reference signal transmitted in a second radiation pattern of multiple beams having different angles simultaneously covering a total of $$\frac{360}{M}$$

degrees of angles per one of M time slots during a second phase of the full sweeping period, wherein N>M≥1;

receiving, via the receiver, the reference signal transmitted in a third radiation pattern of a beam covering a specific angle in response to the second radiation pattern not reaching the user equipment, wherein a beam of the third radiation pattern covers a longer distance than any of the multiple beams of the second radiation pattern;

discerning the reference signal based on an ID of the first radiation pattern;

performing a channel measurement based on the reference signal; and transmitting, via the transmitter, the channel measurement in a same frequency as the reference signal.

* * * * *